United States Patent [19]

George

[11] 4,091,797
[45] May 30, 1978

[54] SOLAR AIR HEATER ARRAY

[75] Inventor: Kurudamannil A. George, Levittown, Pa.

[73] Assignee: SCM Corporation, New York, N.Y.

[21] Appl. No.: 740,600

[22] Filed: Nov. 10, 1976

[51] Int. Cl.² .................................................. F24J 3/02
[52] U.S. Cl. ..................................... 126/270; 237/1 A
[58] Field of Search ............... 126/270, 271; 237/1 A; 165/170, 172, 139

[56] References Cited

U.S. PATENT DOCUMENTS

| | | | |
|---|---|---|---|
| 3,194,228 | 7/1965 | Bargues | 126/271 |
| 3,215,134 | 11/1965 | Thomason | 126/271 |
| 3,859,980 | 1/1975 | Crawford | 126/271 |
| 3,908,631 | 9/1975 | Rom | 126/270 |
| 3,996,918 | 12/1976 | Quick | 126/270 |
| 4,020,989 | 5/1977 | Kantz | 237/1 A |

FOREIGN PATENT DOCUMENTS 276,788  11/1965  Australia ............................ 126/270

*Primary Examiner*—John J. Camby
*Assistant Examiner*—Henry C. Yuen
*Attorney, Agent, or Firm*—Jerry K. Mueller, Jr.; Merton H. Douthitt

[57] ABSTRACT

A solar air heater comprises in array a plurality of structurally rigid, air-canalizing modular ducts communicating in parallel flow with a common header, each duct being about 4–6 meters long, about 1.2 meters wide, and about 100–650 cm² in cross sectional area of its bottom plenum air passageway, and having a top, low velocity air plenum between a transparent cover and a solar heat collector element, and a bottom, higher velocity walled air plenum between said collector element and the base of the duct.

6 Claims, 4 Drawing Figures

SOLAR AIR HEATER ARRAY

This application is referenced to that of J. V. Mullin and W. E. Sauer, entitled *Dryer and Process*, U.S. Ser. No. 740,619 filed Nov. 10, 1976.

BACKGROUND

This invention relates to a solar heater array and more particularly to one that is structurally rigid, i.e., one which does not collapse completely without air flow when assembled and erected for use, although the transparent cover itself can be flexible and thus require inflation during use.

Australian Pat. No. 276,788 is the closest prior art known to applicant. An individual duct or cell for the instant invention can be very much in the conformation of the solar absorber described in that patent, particularly the embodiments depicted in FIGS. 2 and 3 thereof. Also of note is U.S. Pat. No. 3,908,631 showing a collapsible solar absorber. Principal differences between this invention and the teachings of those patents are in the fairly specific and critical length and width of each modular solar heat absorbing duct of the present invention and the cross sectional area of air passageway of its lower plenum for handling large flows of air to attain low (i.e., 10°–20° F. (about 5°–10° C.) temperature rise at high heating efficiency (80+%) with concomitant low pressure drop), their parallel flow array, and the means providing for particular proportioning of air velocity in the upper and lower sections or plena of such duct module.

SUMMARY OF THE THE INVENTION

The solar air heater of this invention comprises in array a plurality of structurally rigid, air-canalizing modular ducts, said ducts communicating in parallel flow with a common air header, said header being directed towards fan suction; each said duct having: a) length of about 4–6 meters, b) width of about 1.2 meters, c) about 100–650 cm$^2$ cross sectional area of lower plenum air passageway; d) a substantially flat bottom, e) low sidewalls transverse to said bottom, f) an open top, g) a transparent cover over said top, h) a solar heat collector element interposed between said bottom of said top for substantially the length of said duct, thereby forming upper and lower air plena for said duct; and i) flow impeding means disposed for impeding air flow velocity in the upper plenum to about 2–20% of that in said lower plenum; at least the bottom and exposed walls of said array being insulated for heat retention.

THE DRAWINGS

DETAILED DESCRIPTION

Figure 1:
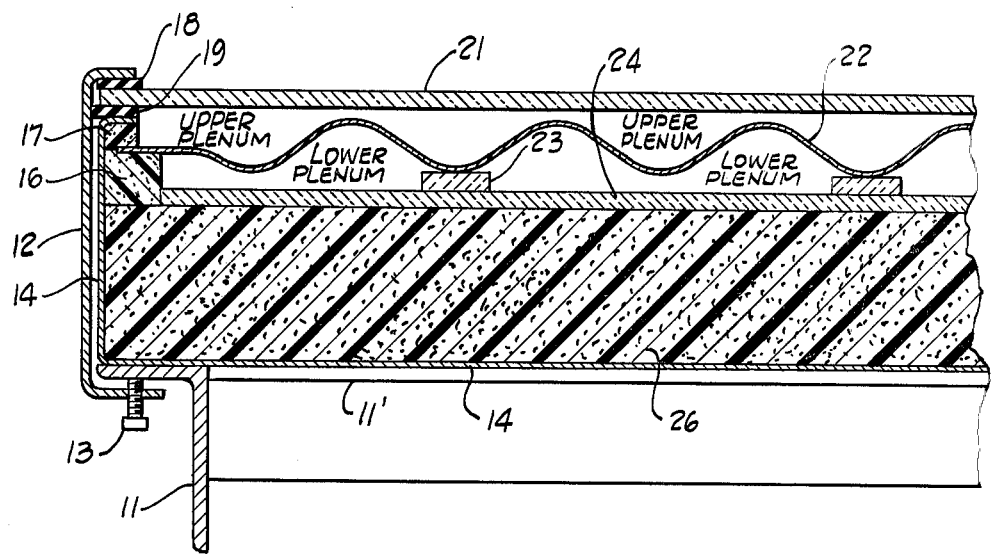
FIG. 1 shows a cut-away view of a cross-section of an experimental nominally 4 feet (1.22 meters) wide × 16 feet (4.87 meters) long (outside dimensions) × 1⅝ inches (4.13 cm.) deep (interior dimension) duct made for testing this invention, the cross-section being through the thickness of the duct normal to a flat transparent cover thereover.

Referring to FIG. 1, items 11 and 11' form a bottom support made of metal to which is clamped clamp 12 by clamping screw 13 drawing clamp 12 down on rubber gasket 18. Item 14 is a unitary sheet metal sidewall and base, and it has a horizontal, inward fold at its left top for accepting rubber gasket 19. The right side of the duct (not shown) is, of course, like the illustrated left, essentially a mirror image.

Retained against the wall are rigid polyurethane foam insulating strips 16 and 17, which also act to receive the left edge of solar heat collector element 22 and hold it in place. The solar heat collector element is corrugated aluminum roofing 0.024 inches (0.61 mm thick) with 2.66 inches (6.75 cm) by ⅞ inch (2.22 cm) pitch. The upper surface of this aluminum roofing exposed to sunlight is coated with dull, flat black paint. The collector element is supported from below by a block of 1 inch (2.54 cm.) × 1 inch × ½ inch (1.27 cm.) thick asbestos mill board 23 which is further supported by transverse asbestos board piece 24. Each said board-like item 24 is a quarter inch thick by 46½ inches (1.18 m.) long, and there are seven pieces of same going across each duct at two-foot intervals for exerting lateral pressure against lower insulating strips. A production model would not need such bulky supports 23 and spacers 24 which tend to disturb air flow, but a bit of turbulence can be desirable for heat transfer in the lower plenum.

Insulating strip 16 and transverse boards 24 are supported directly by rigid polyurethane foam insulation 26 resting on sheet metal base 14 and supports 11 and 11'.

A clear, colorless glass plate 2, 48 inches wide and 16 feet long, is clamped between gaskets 18 and 19. The entire assembly makes a modular duct 4 feet (1.22 m.) wide by 16 feet (4.87 m.) long, with the air passageways in toto being about 46½ inches (1.18 m.) wide (for the upper plenum and a little less for the lower plenum) by 1⅝ (4.13 cm.) inches high (neglecting support pieces 23, spacer boards 24, and the slightly narrower width of insulating strip 17 relative to that of insulating strip 16).

Such individual duct is adequate for a flow of about 600 CFM, that is, 16,990 liters per minute (measured at 70° F. or 21.1° C. and 760 Torr), or about 10 CFM per square foot (i.e., 283 liters per square meter per minute) of surface exposed to solar radiation, that is, about 283 liters such per square meter per minute. The lower air passage in such duct is about 48 square inches (about 310 cm$^2$) in cross section, but can be as little as about 100 cm. and as much as about 650 cm.$^2$ in such cross section.

Figure 2:
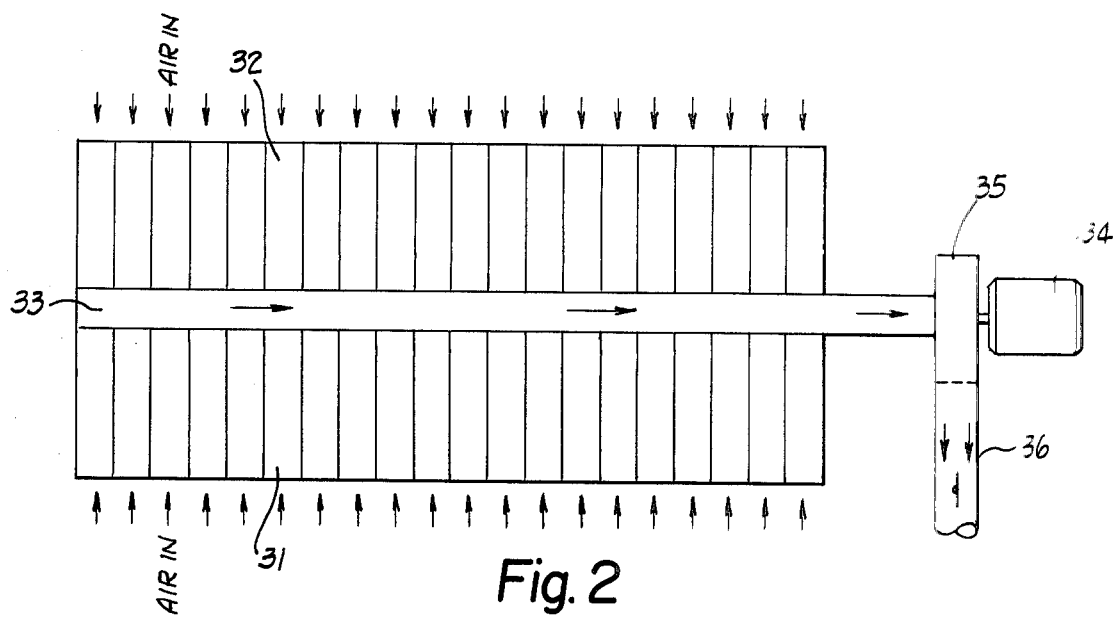
FIG. 2 shows the plan view of a typical array of such ducts juxtaposed to each other for mounting on the flat roof of a building or a section of pitched roof.

In FIG. 2 forty of the air-canalizing ducts are arrayed in two banks of twenty each. Ducts 31 feed into one side of air header 33, and ducts 32 feed into the other. Air that is sucked in each duct is thus collected and passes into suction of blower 35 driven by electric motor 34, and is discharged through passage 36. Each of the air-canalizing modular ducts can be substantially like the one described in FIG. 1 laid side-by-side without, of course, the experimental bottom supporting frame members 11 and 11'. These ducts would be placed on a roof or other supporting structure.

Figure 3:
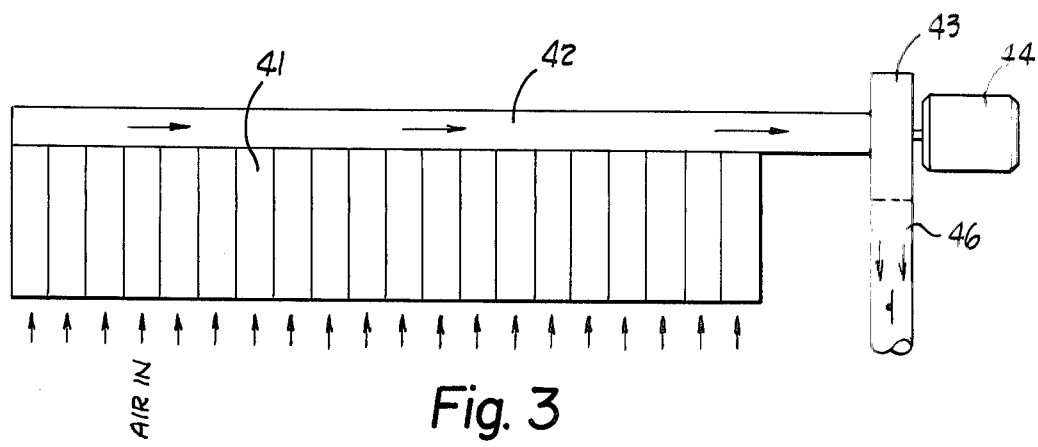
FIG. 3 shows another plan view of a typical array for roof mounting in like manner.

In FIG. 3 twenty of the air-canalizing ducts like those of FIG. 1 are arrayed in a bank. Ducts 41 feed into air header 42. Air that is sucked into each duct is thus collected and passes into the suction of blower 43 driven by electric motor 44 and is discharged through passage 46. Each of the modular ducts can be substantially like the one described in FIG. 1 laid down in side-by-side contact and supported by a roof or other supporting structure.

While the ducts of FIG. 2 and FIG. 3 are built each with a pair of sidewalls, it should be understood that the interior sidewalls of ducts laid in side-by-side relationship could be party walls if desired, (eg. the left sidewall of one acting also as the right sidewall of the adjacent left duct, which would only use posts or the like to support a gasketing strip for a cover or covers).

The size of each duct forming the array is important, not only for ease of assembly with stock materials and ease of arraying them on a roof or the like by a few workmen, optionally assisted by mechanical aids such as hoists, cherry pickers, and the like, but also is critical for obtaining a high efficiency of solar heat transfer to the air flow therethrough coupled with low pressure drop, and also critical for obtaining a small temperature rise in large flow volume of air entering such duct.

Figure 4:
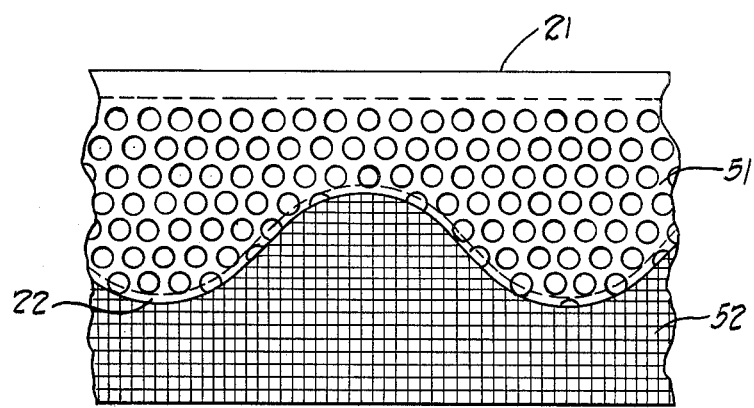
FIG. 4 shows a cut-away view of a diamond cross-section of a duct like that of FIG. 1 at its air inlet end.

In many areas simple bird and bug screening is adequate at the air inlet end of a duct, although more elaborate filtration can be used. In connection with such filtration, the upper air space (upper plenum) of comparatively low velocity of a duct or plurality of ducts can have more flow restrictive filtration therein than does a lower plenum. Enough air should be allowed in the upper plenum to prevent condensation on cold surfaces such as a glass cover plate. Other ways of obtaining appropriate flow restriction are, of course, by use of dampers, perforated plates, say, at either end of the upper plenum which can be variable or fixed flow restrictions. FIG. 4 depicts this feature wherein perforated plate 51 fits over the upper plenum at the air inlet end of the duct to impede the air flow velocity therethrough to about 2–20% of that in the lower plenum which is fitted with screening 52. At the end of air travel in the upper plenum the air flow can blend with that from the lower plenum before or at the header inlet, and, if the header is like that of FIG. 2, it too can be a solar collector with a transparent top and a bottom of heat-absorbing material (with appropriate insulation). In the ordinary case for headers 33 and 42 the end opposite the blower suction is the smallest in cross-section, and the cross-section gradually is enlarged by sloping the bottom to diverge from the top so that all duct flows in the array are approximately equal.

While it can be lower or higher (eg., about one-third as much to about one-third more), the air flow in the lower plenum of a duct optimally is about 600 CFM (that is, about 16,990 liters per minute) with the lower plenum flow being at about 10–50 feet (3–15 m.) per second (and advantageously about 30 feet (9 m.) per second) and the upper at about 1–2 feet (0.3–0.6 m.) per second, or, in other words, about 2–20% of the air velocity in the lower plenum. For such duct the effective (or average) depth of each plenum need only be a few inches at most in cross-section and the solar collection element can be placed off-center or on-center, providing appropriate flow restriction means are used to impede the air flow in the upper plenum relative to the lower.

Because most of the air flow in such duct is in the lower plenum, the volume of such plenum, coupled with the top area of the collector for intake of solar energy, are the critical dimensions for heating such main air flow highly efficiently in fairly large volume and to a small temperature rise with relatively small pressure drop. Efficiency of the air heating can exceed 80% of the local insolation available. The minor air flow in the upper plenum of such duct is mainly to prevent condensation on the inside of the transparent cover and to increase the solar heat collection just a bit. It has no similarly critical dimensions. Naturally, the less friction-producing elements each plenum has will help to minimize the power requirements for moving the air through the apparatus. Hence, simplicity of construction of the duct and smooth main air channels therein are in order for efficiency as well as economy.

While corrugated aluminum roofing that has been painted is shown as the collector, other materials are useful, usually metals with various dark heat-absorbing coatings on their upper side. To increase heat transfer to surface not only corrugations, but pleatings or ribbings or the like ("ridges" broadly), usually longitudinally so not to impede air flow too badly, can be utilized. While it is possible to have such ridges divide one or both plena of a duct into a multiplicity of parallel smaller air channels (this can be used for structural reenforcement), it is not as advantageous as air flow apparatus as is the duct which is divided into simply an upper and a lower plenum that are otherwise unsubdivided. This is because the air flow can be much more even in a latter type duct and amongst such latter type parallel ducts with perfunctory manufacturing craftsmanship. Thus, each plenum can be unsubdivided or subdivided into a plurality of parallel air passages if desired.

The bottom and sidewalls of a particular duct can be made out of sheet metal, eg. steel or aluminum, very easily, but also can be made out of wood or plastic if desired. The transparent cover advantageously is a clear glass for obtaining desirable wavelengths of energy. If the glass is ordinary window glass, it is usually about 3/16 inch thick; if tempered, it need only be about ⅛ inch thick; if it is a clear arcylic or polycarbonate plastic, it can be as thin as 1/16 inch or less, or even be flexible and inflatable with the air flow. The cover need not be flat, but can be arcuate, reaching from sidewall to sidewall or covering a plurality of adjacent ducts. It is advantageous to seal the joints of the cover to sidewalls of the ducts with conventional caulking, gasketing, or the like. While a single cover can cover a plurality of upper plena as mentioned above, it is, of course, handier for each modular duct to have its own separate transparent cover sealed on the edges to its sidewalls rather than a larger one covering a plurality of upper plena and merely being sealed to the extreme sidewalls of the array. It also canalizes the small upper plenum air flow better so each duct (or cell) operates quite like the others in the array.

The heat insulation in the unit can be conventional and placed interior to the walls and bottom or exterior thereto. Conventional fastening can be used throughout, and it is of economic advantage to have the upper plena only sealed against any appreciable leakage of air.

We claim:

1. A solar air heater comprising in array a plurality of structurally rigid, air-canalizing modular ducts,
    said ducts communicating in parallel flow with a common air header,
    said header being directed towards fan suction,
    each said duct having:
    a. length of about 4–6 meters,
    b. width of about 1.2 meters,
    c. a substantially flat bottom,
    d. low sidewalls transverse to said bottom,
    e. an open top,
    f. a transparent cover over said top, g. a solar heat collector element interposed between said bottom and said top for substantially the length of said duct, thereby forming upper and lower air plena for said duct,
h. about 100–650 cm.$^2$ cross sectional area of lower plenum air passageway, and
i. flow impeding means having a flow restrictive member disposed within the upper plenum for impeding air flow velocity in the upper plenum to about 2–20% of that in said lower plenum, at least the bottom and exposed walls of said array being insulated for heat retention.

2. The air heater of claim 1 wherein said cover is glass in pieces fitting each duct.

3. The air heater of claim 1 wherein said cover is plastic.

4. The air heater of claim 1 wherein the conformation of said collector element comprises lengthwise ridges.

5. The air of heater of claim 1 wherein the array comprises two banks of ducts, one on each side of header.

6. The air heater of claim 1 wherein the array comprises a single bank of ducts.

* * * * *

UNITED STATES PATENT AND TRADEMARK OFFICE
CERTIFICATE OF CORRECTION

PATENT NO. : 4,091,797
DATED : May 30, 1978
INVENTOR(S) : Kurudamannil A. George It is certified that error appears in the above-identified patent and that said Letters Patent are hereby corrected as shown below:

On the title page, [73] Assignee:, the Assignee should be -- Proctor & Schwartz, Inc., Philadelphia, Pennsylvania -- rather than "SCM Corporation, New York, N.Y.".

Column 1, line 26, change "plenium" to -- plenum --; line 28, after "high" insert -- air --; line 46, change "of" to -- and --; line 67, change "diamond" to -- diagonal --. Column 2, line 22, after "asbestos" insert -- mill --; line 33, change "2" to -- 21 --; line 47, change "such per" to -- per such --. Column 4, line 35, change "arcylic" to -- acrylic --.

Signed and Sealed this

Seventeenth Day of October 1978

[SEAL]

Attest:

RUTH C. MASON
Attesting Officer

DONALD W. BANNER
Commissioner of Patents and Trademarks